United States Patent [19]

Goldmann et al.

[11] Patent Number: 5,523,387

[45] Date of Patent: Jun. 4, 1996

[54] MASS DYEING OF SYNTHETIC POLYMERS WITH DYES IN SALT FORM

[75] Inventors: Jürgen Goldmann, Münchenstein; Bansi L. Kaul, Biel-Benken, both of Switzerland

[73] Assignee: Sandoz Ltd., Basel, Switzerland

[21] Appl. No.: 259,598

[22] Filed: Jun. 14, 1994

[30] Foreign Application Priority Data

Jun. 16, 1993 [DE] Germany .......................... 43 19 873.2

[51] Int. Cl.$^6$ .......................... C09B 1/20; C09B 57/04; C09B 69/02; C09B 69/04; D06P 1/89; D06P 1/41

[52] U.S. Cl. .......................... 534/728; 524/89; 524/92; 524/93; 524/190; 526/218.100; 526/219; 526/219.100; 526/348; 526/351; 526/352; 544/245; 546/204; 548/528

[58] Field of Search .......................... 534/605, 606, 534/612, 728; 544/245; 546/204; 548/528; 526/218.1, 219, 219.1, 348, 351, 352; 524/89, 92, 93, 190

[56] References Cited

U.S. PATENT DOCUMENTS

| | | | |
|---|---|---|---|
| 3,252,964 | 5/1966 | Fuchs et al. | 534/605 X |
| 3,402,167 | 9/1968 | Entschel | 534/605 X |
| 3,501,453 | 3/1970 | Steinemann | 534/612 |
| 3,518,247 | 6/1970 | Altermatt et al. | 534/606 X |
| 3,519,615 | 7/1970 | Wolfrum et al. | 534/606 X |
| 3,583,970 | 6/1971 | Wolfrum et al. | 534/606 X |
| 3,592,806 | 7/1971 | Iizuka et al. | 534/606 X |
| 3,640,993 | 2/1972 | Hegar | 534/612 |
| 3,658,781 | 4/1972 | Hegar | 534/606 |
| 3,663,527 | 5/1972 | Hegar | 534/606 |
| 3,711,459 | 1/1973 | Hegar | 534/606 X |
| 3,749,708 | 7/1973 | Hegar | 534/606 |
| 4,036,826 | 7/1977 | Boehmke | 534/605 X |
| 4,160,643 | 7/1979 | Gregory | 534/606 X |
| 4,246,172 | 1/1981 | Boehmke et al. | 534/728 X |
| 4,344,879 | 8/1982 | Mohr et al. | 534/605 X |
| 4,422,969 | 12/1983 | Beecken | 534/605 X |
| 4,451,398 | 5/1984 | Patsch et al. | 534/605 X |
| 4,652,632 | 3/1987 | Colberg | 534/728 |

FOREIGN PATENT DOCUMENTS

| | | | |
|---|---|---|---|
| 0075773 | 4/1983 | European Pat. Off. | 534/606 |
| 2220418 | 1/1990 | United Kingdom | 534/728 |
| 2236536 | 4/1991 | United Kingdom | 534/728 |
| 2252976 | 8/1992 | United Kingdom | 534/728 |

OTHER PUBLICATIONS

Search Report, Great Britain dated 21. Jul. 1994 for GB Appn. 9411793.4

*Primary Examiner*—Floyd D. Higel
*Attorney, Agent, or Firm*—Robert S. Honor; Carl W. Battle; Michael P. Morris

[57] ABSTRACT

This invention relates to dyes in salt form which are useful for mass dyeing of synthetic polymers. In particular, this invention relates to ammonium or immonium salt-containing dyes that display good polymer affinity, and the methods for using those dyes to color polymeric substrates.

9 Claims, No Drawings

MASS DYEING OF SYNTHETIC POLYMERS WITH DYES IN SALT FORM

The invention relates to mass dyeing of synthetic polymers.

Mass dyeing of synthetic polymers creates a number of difficulties.

On the one hand, the dye for mass dyeing must be able to withstand the high temperature of the polymer melt (typically in the region of 150°–300° C.) and also be applicable evenly throughout the melt to give a level dyeing.

On the other hand, the dye not only needs to have a good affinity to the polymer, but also must not migrate out of the substrate after dyeing (i.e. must not bleed or bloom).

It has been found that the dyes according to the invention fulfill all these criteria.

Mass dyeing is typically carried out by
i) blending (dry mixing) the dye in powder form with the polymer in the form of granules, chips or powder,
ii) melting the resultant mix at elevated temperature (preferably from 150°–300° C., independent of the melting point of the polymer to be dyed) and
iii) extruding the resultant mass preferably to form fibers, films or threads.

During mass dyeing, the dyes of the invention have been found to dissolve in the polymer and so form an even transparent dyeing. They also show good affinity for the polymer and exhibit no tendency to migrate out of the polymer, that is to say they do not bloom or bleed.

The dyes of the invention are especially good for mass dyeing polyolefins, especially polyolefins that can be spun to fibers or into the form of a thread or filament.

According to the invention there is provided a compound of formula I

in which

F is the radical of a dyestuff or pigment molecule free of sulphonic acid groups;

$R_1$ is a direct bond or a bridging group;

$R_2$ is a $C_{8-24}$ aliphatic group; preferably $C_{8-24}$alkyl or $C_{8-24}$alkenyl;

$R_3$ is a group of the formula —COO—, —SO$_3$—, —PO$_3$— or —PO$_2$—;

$A^+$ is a group containing a sterically hindered ammonium or immonium group;

m is 1, 2, 3 or 4;

n is 1, 2 or 3; and p is 1, 2, 3, or 4 with the proviso that n×p=m.

Suitable dyestuffs which form the radicals F of the present invention and react to give salts of the invention are, for example, dyestuffs given in the Color Index, Third Edition 1971 and supplements (see also the Color Index International 1987) under "Pigments", "Disperse Dyes" or "Solvent Dyes".

F is preferably F' where F' is a radical derived from a dyestuff or pigment of the azo, anthraquinone, phthalocyanine, perylene, indigo, thioindigo, quinacridone, dioxazine, isoindoline, isoindolinone or diketopyrrolo-pyrrole series, especially those of the azo, anthraquinone, phthalocyanine or perylene series, especially phthaloperinone series.

The dyestuff from which F is derived may be metallized or metal-free. Preferred metals in such metallized forms are selected from Cr, Ni, Cu, Co, Mn and Al.

Preferably $R_1$ is $R_1'$ where $R_2'$ is a divalent bridging group, especially of the formula —O—, —CO—, —NR$_3$—, —O—CO—, —CO—O—, —SO$_2$—, —NR$_3$—CO—, —CO—NR$_3$—, —SO$_2$—NR$_3$— or —NR$_3$—CO— NR$_3$— in which $R_3$ is hydrogen or $C_{1-4}$alkyl.

$R_2$ is preferably $R_2'$ where $R_2'$ is a monovalent aliphatic group derived from a higher saturated or unsaturated fatty acid. More preferably $R_2$ is $R_2''$ where $R_2''$ is derived from any (preferably commercially available) fatty acid, oleic acid or a monosulphonic acid, monophosphonic acid or monophosphinic acid of a $C_{8-24}$ aliphatic group, especially $C_{8-24}$ alkyl or $C_{8-24}$alkenyl.

Preferably n is 1.

Depending on the dyestuff from which F is derived, m is any number from 1 to 4 inclusive. Preferably where F is derived from azo, anthraquinone or perylene (especially phthaloperinone) m is 1 or 2 and when F is derived from phthalocyanine, m is 1 to 4 inclusive.

Preferably $A^+$ is $A^+_1$ where $A^+_1$ is a group of the formulae a) to e)

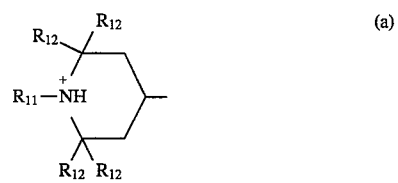

(a)

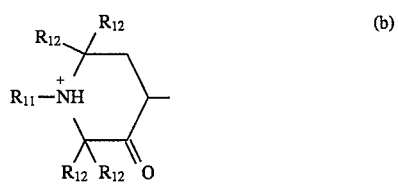

(b)

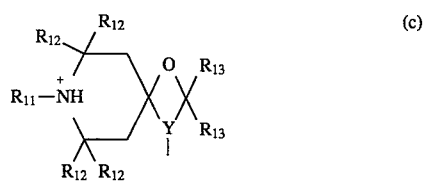

(c)

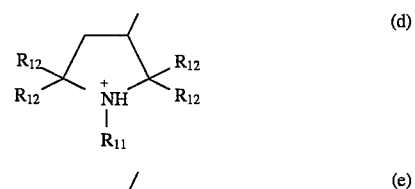

(d)

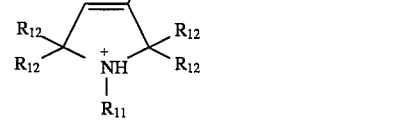

(e)

in which $R_{11}$ is hydrogen or $C_{1-4}$alkyl (preferably hydrogen or methyl, especially hydrogen);

each $R_{12}$ independently is $C_{1-5}$alkyl, preferably methyl;

one group $R_{13}$ is selected from hydrogen, methyl and ethyl and the other group $R_{13}$ is selected from hydrogen, methyl, ethyl and phenyl;

or both groups $R_{13}$ form a group —(CH$_2$)$_n$— and

Y is a group of the formula —N—CO— or —CO—N—.

More preferably $A^+$ is $A^+_2$ where $A^+_2$ is a group of formula a)

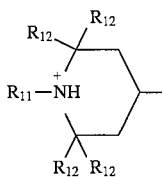

Compounds of formula I can be prepared by reacting one mole of a compound of formula II $$F\text{—}(R_1\text{—}A_1)_m \quad \quad (II)$$

where $A_1$ is a group containing a sterically hindered amine or imine group with a protonatable nitrogen atom, with p moles of an acid of formula III $$R_2\text{—}(R_3^-)_n \quad \quad (III)$$

Compounds of formula II are known or can be made from known compounds by known methods.

Compounds of formula III are known or can be made from known compounds by known methods.

Protonation (salt formation) is carried out by known methods, preferably by simply mixing the components in aqueous medium.

Compounds of formula II and III can be mixed together with the polymer to form the compounds of formula I.

Mass dyeing can be carried out by known methods.

Further according to the invention there is provided a colored polymeric composition comprising i) a polymeric material and ii) 0.01 to 5% of a compound of formula I (based on the weight of polymeric material present) or reactants capable of forming a compound of formula I during the formation of the polymeric composition.

For the avoidance of doubt, the polymeric composition may be formed by mixing appropriate amounts of compounds of formulae II and III together to form the compound of formula I in situ with the polymer.

The amount of compound of formula I that is added to the polymer is preferably 0.01 to 3%, especially 0.1 to 1.5% based on the weight of polymer present.

Preferred polymers include all commercially available polyolefins, for example polypropylene, high, low and medium density polyethylene (i.e. HDPE, MDPE, LLDPE and LDPE).

The formation of the dyed polymer into threads can be carried out by known methods, for example polymers can be spun into fibers with fine titre.

The resultant dyed polymer shows good fastness properties, especially good light fastness properties, rub fastness properties, wash fastness properties, migration fastness properties and dry cleaning fastness properties. The polymer also shows very good stability to deterioration due to weathering properties, such as light (UV light especially), heat and oxidation.

The polymeric compositions of the invention can also be used as masterbatch compositions (hereinafter referred to as concentrates) for introducing color in concentrated form to a polymer.

These concentrates are useful for coloring polypropylene that is transformed into fine fibers or threads.

Preferably these concentrates may also contain an inert polymer that has good affinity to the polymer to be dyed, i.e. polyolefin in powder form or poly ε-caprolactam.

Such concentrates according to the invention comprise 10–70% dye and 90–30% of polymer and optionally inert polymer as defined above.

The preparation of such concentrates is known, for example through mixing and kneading the components, optionally in the presence of an easily removable (eg by distillation) inert solvent.

The invention will now be illustrated by the following Examples in which all parts and percentages are by weight unless indicated to the contrary and all temperatures are in °C.

EXAMPLE 1

The preparation of the compound 1a

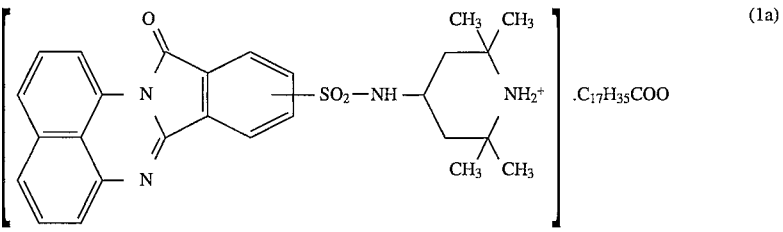

a) 54 parts of 12-H-phthaloperin-12-one are added whilst stirring well over 45 minutes to 358 parts of chlorosulphonic acid whereby the temperature is kept constant at 24° C.±1° C. To complete the reaction, the mixture is stirred for a further 24 hours. The resulting sulphochloride is added portionwise to a vessel containing 600 parts of ice and 100 parts of water stirring and cooling well so that the temperature does not exceed 20° C. To make sure that this actually happens a further 1200 parts of ice are added to the acid chloride suspension and stirring is carried out for a further 15 minutes. The resultant suspension is filtered and the residue is washed with 2000 parts of an ice/water mix. The resultant sulphochloride of 1-H-phthaloperin-12-one is slowly added over 30 minutes to a mixture of 500 parts of water, 300 parts of ice and 64.2 parts of 2,2,6,6-tetramethyl-4-aminopiperidine, stirred for 12 hours whereby the temperature is allowed to rise to 20° C.±2° C. The resultant orange coloured suspension is filtered and the residue is washed with 300 parts of water, then in a solution of 21.2 parts of soda in 500 parts of water, is stirred at room temperature for 2 hours, filtered washed neutral with water and dried at 80° C. in the presence of a vacuum at 30 mbar.

b) 24.4 parts of the resultant compound of a) above is added to 200 parts of demineralised water to which 5.8 parts of HCl has been added and this is stirred for 2 hours and whilst continuing to stir, is reacted with a solution (at 90° C.) of 14.2 parts of stearic acid in 500 parts of demineralised water and 2 parts of NaOH.

The resulting orange suspension is stirred for 2 hours at 50° C. and the dye is filtered off. This dye is then washed four times with 100 parts of water (for each wash) and it is then dried at 80° C. under a vacuum of 30 mBar.

The resultant dye is particularly suitable for mass dyeing of polyolefins, in particular for the mass dyeing of polypropylene that is going to be spun into fine threads.

EXAMPLE 2

Preparation of the Concentrate 68.4 parts of poly ε-caprolactam and 2.8 parts of stearic acid are dissolved at 50° C. in 320 parts of acetone after which 4.8 parts of the 12-H-phthaloperin-12-one-2',2',6',6'-tetramethylpiperidinyl-4'-amide product of Example 1a is added and this is stirred for 2 hours at 55° C.

The acetone is then distilled off and a dyestuff concentrate results which can easily be added and mixed in most polymers.

EXAMPLE 3

Application Example 99.8 parts of a commercially available polypropylene are gelled with 0.1 parts of stearic acid and 0.1 parts of the 2-H-phthaloperin-12-one-2',2',6',6'-tetramethylpiperidinyl-4'-amide product of Example 1a for 30 seconds in a "Gelimat" machine and then immediately after pressed between two steel plates under a pressure of 31 kg/cms². A very level dyed sheet of polypropylene results.

EXAMPLES 4–19

By a method analogous to that of Example 1 from appropriate reactants dye salts given in the Table can be formed.

| Example No. | | Nuance |
|---|---|---|
| 4 | [anthraquinone with two NH-(2,4,6-trimethyl-3-SO$_2$-A$_3^+$-phenyl) groups; counterion COO$^-$-(CH$_2$)$_{12}$-COO$^-$] | blue |
| 5 | [anthraquinone-1,4-diolate with two A$_3^+$ counterions; COO$^-$-(CH$_2$)$_{12}$-COO$^-$] | blue |
| 6 | [1-amino-4-olate-anthraquinone with A$_3^+$ and C$_{17}$H$_{35}$COO$^-$] | blue |
| 7 | | |

| Example No. | | Nuance |
|---|---|---|
| 7 | 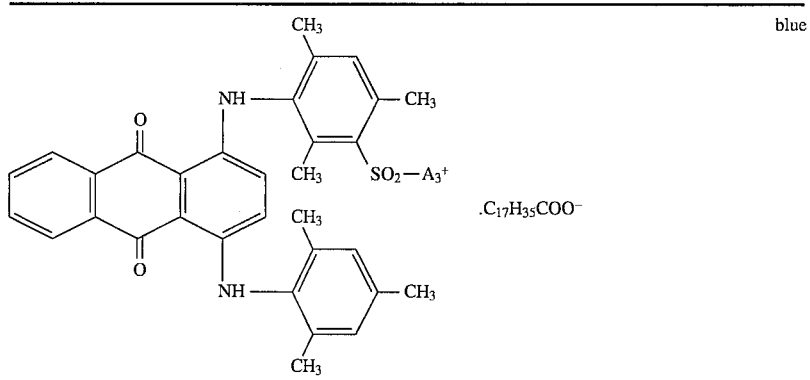 .C₁₇H₃₅COO⁻ | blue |
| 8 | 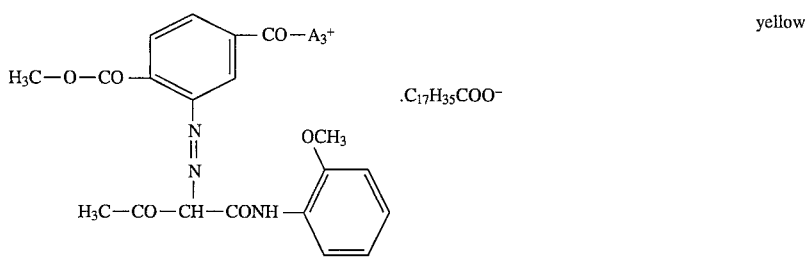 .C₁₇H₃₅COO⁻ | yellow |
| 9 | 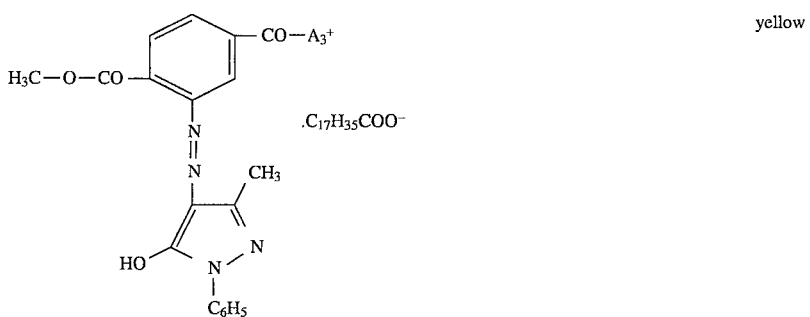 .C₁₇H₃₅COO⁻ | yellow |
| 10 | 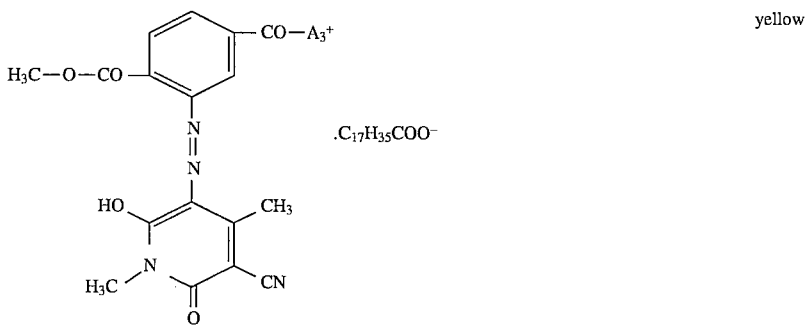 .C₁₇H₃₅COO⁻ | yellow |
11

-continued
| Example No. | | Nuance |
|---|---|---|
| 12 | 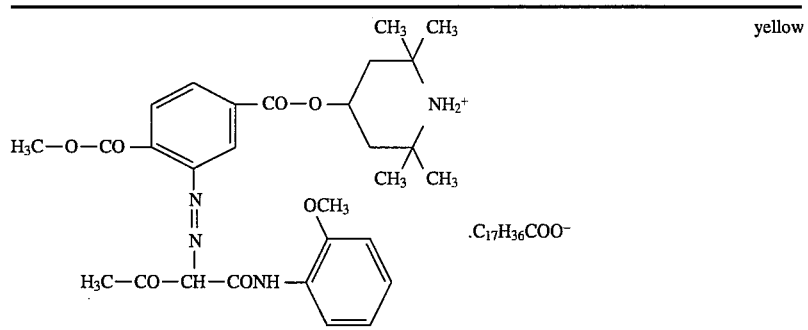 | yellow |
| 13 | 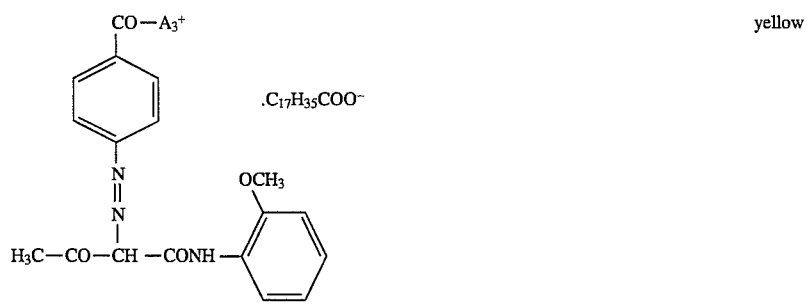 | yellow |
| 14 | 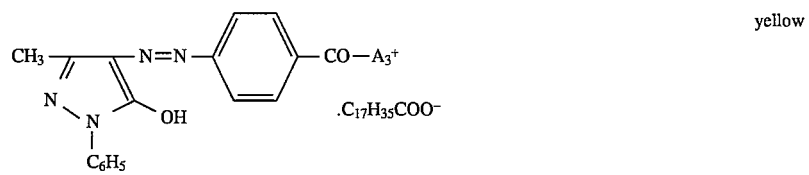 | yellow |
| 15 | 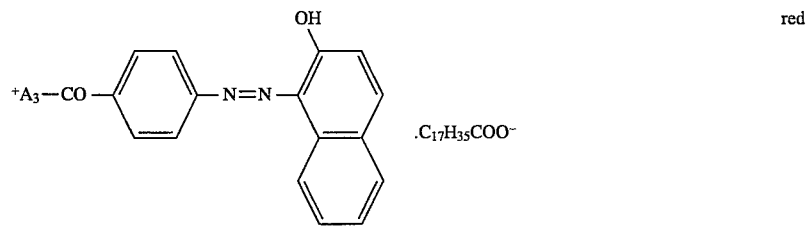 | red |
| 16 | 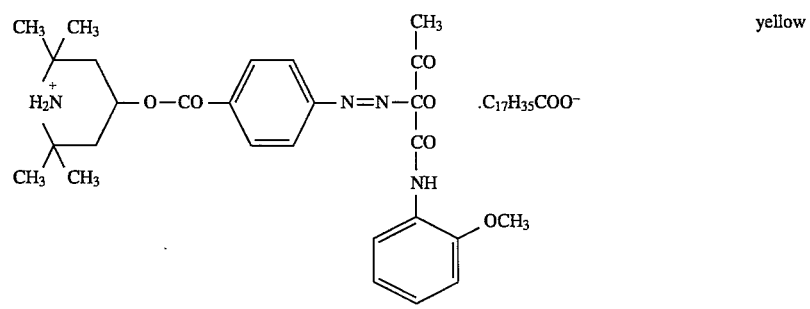 | yellow |

-continued
| Example No. | Nuance |
|---|---|
| 17 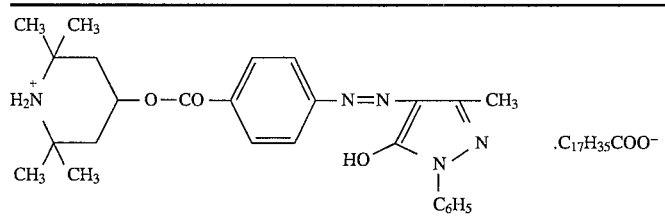 | yellow |
| 18 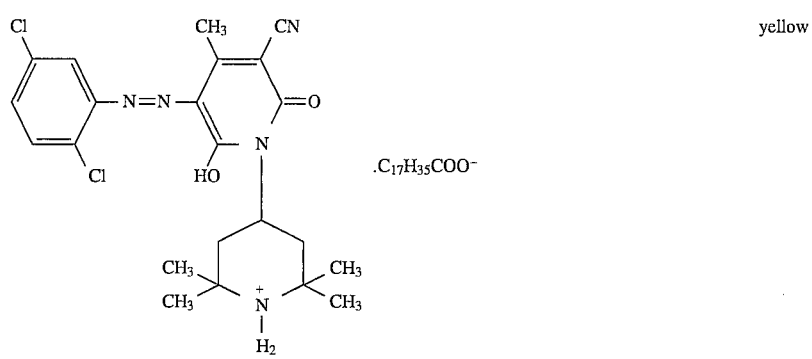 | yellow |
| 19 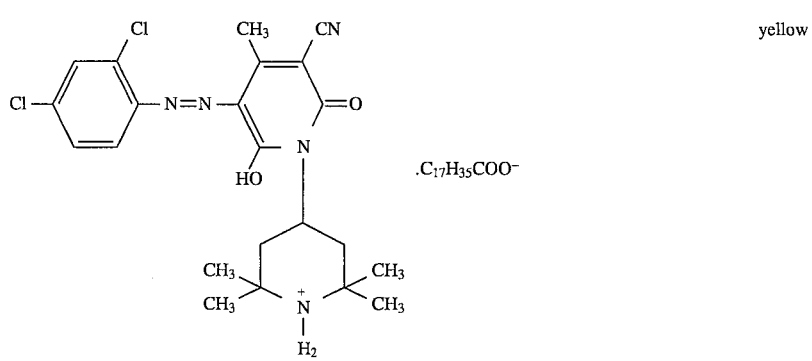 | yellow |
| 20 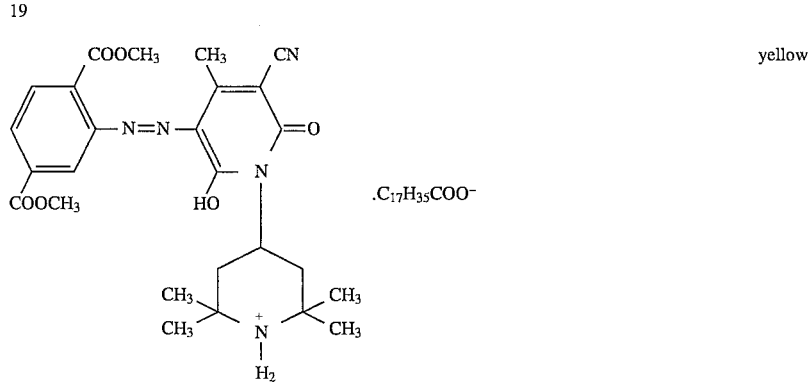 | red | where $A_3^+$ is a group of the formula

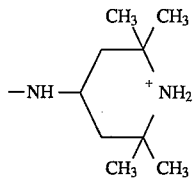

Examples 2 and 3 can be repeated using any one of the appropriate amine, amides imide or ester used in the preparation of compounds of Examples 4 to 19 in place of the 2-H-phthaloperin-12-one-2',2',6',6'-tetramethylpiperidinyl-4'-amide product of Example 1a.

We claim:

1. A compound of formula I $$F-(R_1-A^+)_m \cdot [R_2-(R_3^-)_n]_p \quad (I)$$

in which

F is the radical of a dyestuff or pigment molecule free of sulphonic acid groups;

$R_1$ is a direct bond or a divalent bridging group selected from the group consisting of —O—, —CO—, $NR_1$—, —O—CO—, —CO—O—, —SO$_2$—, —NR$_1$—CO—, —CO—NR$_1$—, —SO$_2$—NR$_1$— and —NR$_1$—CO—NR$_4$—, $R_2$ is a $C_{8-24}$ aliphatic group;

$R_3$ is a group of the formula —COO—, —SO$_3$—, —PO$_3$—OR—PO$_2$—;

$R_4$ is hydrogen or $C_{1-4}$alkyl;

$A^+$ is a group containing a sterically hindered ammonium or ammonium group selected from the group consisting of

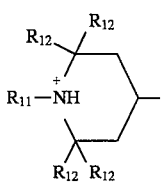 (a)

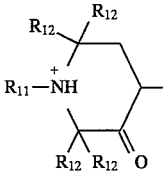 (b)

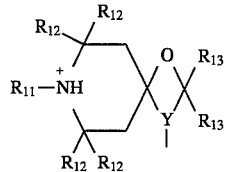 (c)

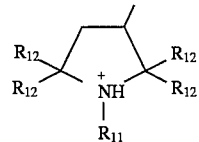 (d)

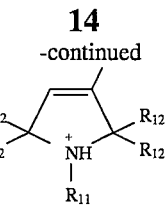 (e)

in which $R_{11}$ is hydrogen or $C_{1-4}$alkyl each $R_{12}$ independently is $C_{1-5}$alkyl, one group $R_{13}$ is selected from hydrogen, methyl and ethyl and the other group $R_{13}$ is selected from hydrogen, methyl, ethyl and phenyl;

or both groups $R_{13}$ form a group —(CH$_2$)$_{11}$— and

Y is a group of the formula —N—CO— or —CO—N—.

m is 1, 2; 3 or 4;

n is 1, 2 or 3; and p is 1, 2, 3, or 4 with the proviso that n×p=m.

2. A compound according to claim 1 in which F is F' where F' is a dyestuff or pigment radical selected from the group consisting of the azo, anthraquinone, phthalocyanine, perylene, indigo, thioindigo, quinacridone, dioxazine, isoindoline, isoindolinone and diketopyrrolo-pyrrole dyestuff or pigment radicals.

3. A compound according to claim 1 in which $R_2$ is $R_2''$ where $R_2''$ is a divalent bridging group of the formula —O—, —CO—, —NR$_1$— —O—CO—, —CO—O—, —SO$_2$—, —NR$_1$—CO—, —CO—NR$_1$—, —SO$_2$—NR$_1$ and —NR$_1$—CO—NR$_1$ in which $R_4$ is hydrogen or $C_{1-4}$alkyl.

4. A compound according to claim 1 in which $R_2$ is $R_2''$ where $R_2''$ is a radical selected from radicals of the group consisting of fatty acid, oleic acid, monosulphonic acid, monophosphonic acid and monophosphinic acid of a $C_{8-24}$ aliphatic group.

5. A compound according to claim 1 in which $A^+$ is $A^+_2$ where $A^+_2$ is a group of formula a)

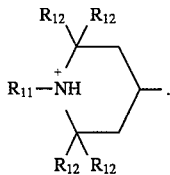

6. A polymeric composition comprising i) a polymeric material and ii) 0.01 to 5% by weight of a compound of formula I according to claim 1, based on the weight of polymeric material present, or one mole of a compound of formula II $$F-(R_1-A_1)_m \quad (II)$$

where $A_1$ is a group containing a sterically hindered amine or imine group with a protonatable nitrogen atom, and p moles of an acid of formula III $$R_2-(R_3-)_n \quad (III)$$

which reactants are capable of forming a compound of formula I during the formation of the polymeric composition.

7. A process for coloring a substrate comprising applying a compound of formula I according to claim 1 to that substrate.

8. A process according to claim 7 in which 0.01 to 5% of a compound of formula I defined in claim 1 is applied to the substrate 9. A process according to claim 8 in which the substrate is a polyolefin.

* * * * *